(12) United States Patent
Bovyrin

(10) Patent No.: US 10,810,462 B2
(45) Date of Patent: Oct. 20, 2020

(54) OBJECT DETECTION WITH ADAPTIVE CHANNEL FEATURES

(71) Applicant: Intel Corporation, Santa Clara, CA (US)

(72) Inventor: Alexander Bovyrin, Nizhny Novgorod (RU)

(73) Assignee: Intel Corporation, Santa Clara, CA (US)

( * ) Notice: Subject to any disclaimer, the term of this patent is extended or adjusted under 35 U.S.C. 154(b) by 206 days.

(21) Appl. No.: 15/769,118

(22) PCT Filed: Oct. 19, 2016

(86) PCT No.: PCT/US2016/057635
§ 371 (c)(1),
(2) Date: Apr. 18, 2018

(87) PCT Pub. No.: WO2017/095543
PCT Pub. Date: Jun. 8, 2017

(65) Prior Publication Data
US 2018/0314916 A1 Nov. 1, 2018

Related U.S. Application Data

(60) Provisional application No. 62/261,350, filed on Dec. 1, 2015.

(51) Int. Cl.
*G06K 9/00* (2006.01)
*G06F 15/18* (2006.01)
*G06K 9/62* (2006.01)

(52) U.S. Cl.
CPC ....... *G06K 9/6257* (2013.01); *G06K 9/00791* (2013.01); *G06K 9/623* (2013.01);
(Continued)

(58) Field of Classification Search
USPC ........ 382/100, 103–104, 106–107, 154, 162, 382/168, 173, 181, 167, 190, 199, 209,
(Continued)

(56) References Cited

U.S. PATENT DOCUMENTS

2008/0107341 A1* 5/2008 Lu ...................... G06K 9/00248
382/190
2011/0081079 A1* 4/2011 Wang ................... G06K 9/6257
382/167

(Continued)

OTHER PUBLICATIONS

Filtered Channel Features for Pedestrian Detection: 2015, by (Shanshan Zhang) year 2015.*

(Continued)

*Primary Examiner* — Seyed H Azarian
(74) *Attorney, Agent, or Firm* — Trop, Pruner & Hu, P.C.

(57) ABSTRACT

In accordance with some embodiments Adaptive Channel Features may be implemented by determining random features. The random features may be determined by defining a maximum allowed feature size of training samples. Then random filter positions of a training sample are sampled. Thereafter, pixel weights in a patch of the maximum allowed feature size is calculated. A feature is selected for applying a boosted classifier.

30 Claims, 5 Drawing Sheets

(52) U.S. Cl.
CPC ......... *G06K 9/6228* (2013.01); *G06K 9/6232* (2013.01); *G06K 9/6298* (2013.01)

(58) Field of Classification Search
USPC ............... 382/220, 224, 232, 254, 274, 276, 382/285–291, 305, 312; 706/12
See application file for complete search history.

(56) References Cited

U.S. PATENT DOCUMENTS

| | | | | |
|---|---|---|---|---|
| 2011/0249867 A1* | 10/2011 | Haas | ................... | G06K 9/6257 382/103 |
| 2014/0286527 A1* | 9/2014 | Harthattu | ............ | G06K 9/6257 382/103 |
| 2015/0081600 A1* | 3/2015 | Rasolzadeh | .......... | G06K 9/6256 706/12 |

OTHER PUBLICATIONS

PCT search report and written opinion dated Jan. 31, 2017 in corresponding PCT/US/2016/057635 (10 pgs).

\* cited by examiner

OBJECT DETECTION WITH ADAPTIVE CHANNEL FEATURES

CROSS-REFERENCE TO RELATED APPLICATION

This application is a non-provisional application claiming priority to U.S. Provisional Application No. 62/261,350 filed Dec. 1, 2015, hereby expressly incorporated by reference herein.

BACKGROUND

This relates to detecting objects, such as vehicles and pedestrians on the road.

Object detection is very popular building block of many computer vision applications such as vehicle detection, pedestrian detection, traffic signs detection. These detections are used in advanced driver assistance systems, video surveillance systems and others. Such tasks often need to run in realtime, often on low-power mobile or embedded devices, and so the object detection needs to be very computationally efficient.

BRIEF DESCRIPTION OF THE DRAWINGS

Some embodiments are described with respect to the following figures.

DETAILED DESCRIPTION

Initially, an object detector calculates so-called feature channels using linear and non-linear transformations of the input image to extract gradient information and color information. A feature channel is a registered map of an original image where output pixels are mapped to input pixels by a linear or non-linear transformation. Then, a sliding window approach and boosting classifier such as RealBoost (described in Additive logistic regression: a statistical view of boosting by J. Friedman, et al., in The Annals of Statistics, 2000), is used to perform object/non-object classification and to select best features for classification.

The features are divided into groups. In the beginning of the classification process for the first weak classifiers, the fastest features are used. The decision about which features can be used for the first weak classifiers can be based on platform computational restrictions. First weak classifiers may be based on Aggregate Channel Features as described in Bin Yang, et al., "Aggregate Channel Features for Multi-view Face Detection," Biometrics (IJCB), 2014 IEEE International Joint Conference on IEEE, 2014). Most of the non-object windows are rejected using the fast features.

Then in the middle of the classification process, use smarter and more complex features. The decision about which features can be used in the middle of the classification process can be based on platform computational restrictions. Smarter features may be Filtered Channel Features (FCF). See S. Zhang, et al., "Filtered channel features for pedestrian detection," in Proc. of CVPR, 2015. Then the flow exits with a solution that this is not an object, using FCF features.

At the end of the classification process (for the series of the last weak classifiers), the most computationally expensive and most distinctive features, called Adaptive Channel Features, are constructed, taking into account mistakes of previously used features.

Figure 1:
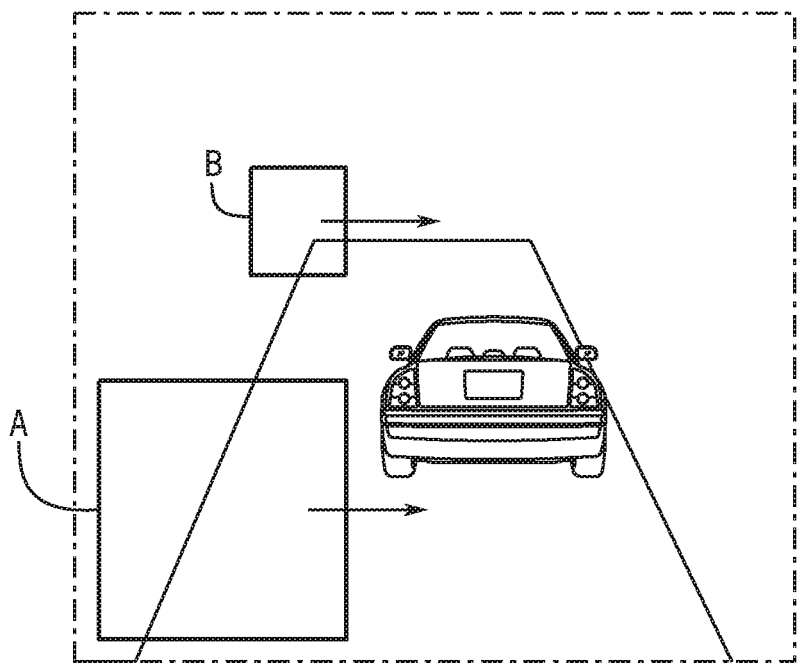
FIG. 1 shows that for advanced driver assistance systems, camera calibration parameters are used to reduce the number of sliding windows to be checked by a boosting classifier, taking into account perspective law that defines expected size of objects on a road according to one embodiment.

A classical sliding window approach finds an object of particular fixed size (for example, 50×100 in cases of pedestrian detection) within an image. To detect larger objects in the same image, an algorithm scales the image down and then repeats the sliding window procedure. For advanced driver assistance systems, camera calibration parameters can be used to reduce the number of sliding windows to be checked by a boosting classifier, taking into account a perspective effect that defines expected size of objects in a road as illustrated in FIG. 1. The sliding windows A and B are scanned across the roadway as indicated by arrows in FIG. 1. The near window A is larger than the far window B to account for perspective.

The detection procedure involves execution of a boosting classifier at each window position. One useful classifier is the so-called boosting chain. It takes an input image patch as a rectangular block of pixels and iteratively computes a response, a floating-point value, as a sum of up to several hundreds of weak classifier responses.

The response of each weak classifier is summed. Right after each intermediate sum is computed, it is compared to a "threshold," whose value is determined during the training. If the sum is below "threshold," the remaining stages are skipped and the window is considered as "not an object." Otherwise, if the intermediate sums are all above the corresponding thresholds, the window is considered as a good object candidate and its position and size are stored together with the final sum of responses, which is treated as a candidate score. All such candidates are collected from all the image layers. And then, since each real object in a scene usually yields several object candidates near each other, object candidates are grouped, or more exactly, weaker candidates are rejected in favor of better candidates using a non-maxima suppression procedure, which involves the compute scores. The list of remaining object candidates is the algorithm's output.

For first Nf weak classifiers, very fast features may be used. For example, Aggregate Channel Features (ACF), with a cell size that equals to 6×6 pixels, may be used. To accelerate calculations, all feature channels can be downscaled (e.g. six times). Thus, the ACF feature is represented by a corresponding pixel value in that corresponding channel.

Then for the next Ns weak classifiers in the boosting chain, Filtered Channel Features (FCF) can be used, for example, that have a cell size equal to 6×6 pixels. The same resized image may be used for FCF features calculation.

For the last Na weak classifiers, features construction may be based on errors of previously used weak classifiers. Nf, Ns, and Na parameters depend on platform computational capabilities and they are selected during system tuning to obtain a real-time solution in one embodiment.

Figure 2:
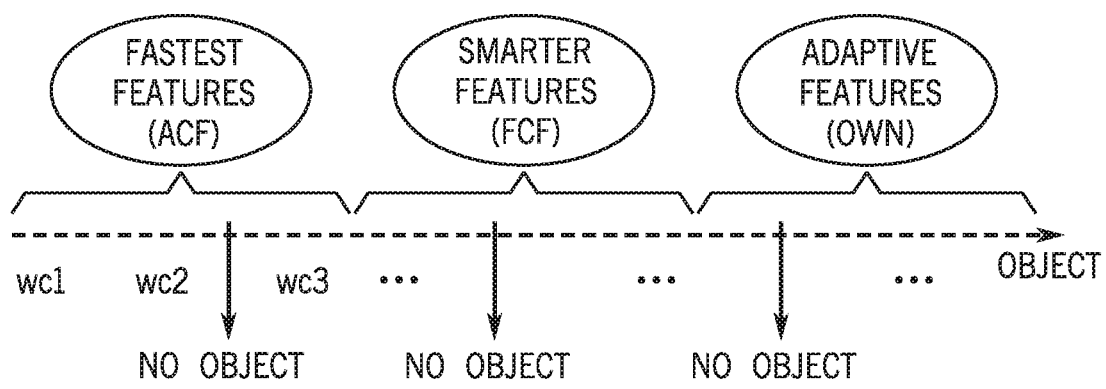
FIG. 2 schematically shows the boosting classification process according to one embodiment.

The boosting classification process described above with different features approach is schematically illustrated by the scheme shown in FIG. 2. Weak classifiers wc1, wc2, wc3 . . . are used for fastest features based on Aggregate Channel Features (ACF), followed by smarter features based on Filtered Channel Features (FCF) followed by Adaptive Channel Features.

Adaptive Channel Features are used for the last series of weak classifiers in boosting classifiers. To construct each new weak classifier using Adaptive Channel Features the following sequence may be used:

(1) Reduce the size of each feature channel c (e.g. 6 times);

(2) For every feature channel c, generate an average distribution Ac of these channel values, taking into account a training weight of each positive sample According to a boosting training procedure each training sample has its own weight. Thus Ac is a weighted average of channel values. Channel values of samples that were not classified well using previously used weak classifiers are added with larger weight into average image Ac. Only positive samples may be used to calculate Ac in one embodiment;

(3) Calculate standard deviation Sc across all positive samples for each feature channel c;

(4) Construct M random features taking into account Ac and Sc. To calculate random features, define a maximum allowed size of feature (FeatureWidth, FeatureHeight) in a training sample. Then sample random filter positions xf,yf in a training sample.

For each pixel with (i, j)-coordinates in channel c in rectangle R=(xf, yf, xf+FeatureWidth, yf+FeatureHeight), calculate its own weight Wij, that weight may be −1, 1 or 0 in one embodiment.

To calculate the weight find a maxSc, the maximal value of Sc. After this, for each pixel (i,j) in R set $W_{ij}=0$ if $Sc(i,j)$>$coef*maxSc$, where coef is a parameter of algorithm.

If Sc(i,j) is less than or equal to coef*maxSc, sample an auxiliary number n using uniform distribution in [0,maxAC] range, where maxAc is a maximum value of AC in rectangle R.

Then set $W_{ij}=1$ if n<maxSc/2. If n>=maxSc/2, then define $W_{ij}=-1$.

After this, sum all channel pixels (I,j) in R with weights $W_{ij}$.

(5) Calculate M random features for each feature channel c and select the best feature for using a boosting classifier such as the RealBoost training procedure.

Since Ac and Sc are recalculated, for each weak classifier, these features are adaptive to training progress.

The detection algorithm is described in the following pseudo-code:

a. Input: color image, output: list of rectangles, containing "objects"

b. Set the initial scale=1, make the list of object candidates or feature candidate list (FCL) empty.

c. Until the original image width is not less than $W_0*scale$ and the original image height is not less than $H_0*scale$, where ($W_0 \times H_0$) is the window size for the trained classifier, do:

c.1 Generate feature channels. Fast pyramid calculation approach can be used for this purpose.

c.2. For each pair of integers (I, j) so that the rectangle $R_{ij}=\{left=x+j*dx, top=y+1*dy, width=W_0, height H_0\}$ fits entirely in the current image layer, dx=dy=1, run the boosting classifier where "wc" means weak classifier:

```
Sij:=0
(*)while K<number_of_wc do
    if k<Nf
        Sij:=Sij +
            AggregateChannelFeatures_WeakClassifierk(Rij)
        if Sij <Tk then exit the loop (*)
    else if k<Ns
        Sij:=Sij +
            FilteredChannelFeatures_WeakClassifierk(Rij)
        if Sij <Tk then exit the loop (*)
    if k<Na
        Sij:=Sij +
            AdaptiveChannelFeatures_WeakClassifiersk(Rij)
    If Sij <Tk then exit the loop(*)
```

If the loop (*) was interrupted, skip the rectangle. Otherwise, store the scaled rectangle and its score: FCL:=FCL u ($R_{ij}*scale$, $S_{ij}$), where R*scale means that the scale rectangle top-left position and the size are multiplied by "scale" to represent the object candidate in the original, unsealed, image coordinates.

c.3. Increase the scale: scale*scale_increase_constant d. Apply non-maxima suppression to FCL, constructed in step c:

d.1 Sort FCL in descending order by the score $S_i$ d.2. For each ($R_i$, $S_i$) starting from the highest score, do
    For all ($R_j$, $S_j$) such that $S_j \leq S_i$ do
      if area($R_i \cap R_j$)/min(area ($R_i$), area($R_j$))>0.65 then remove ($R_j$, $S_j$) from FCL e. Return the filtered FLC as the algorithm result.

Figure 3:
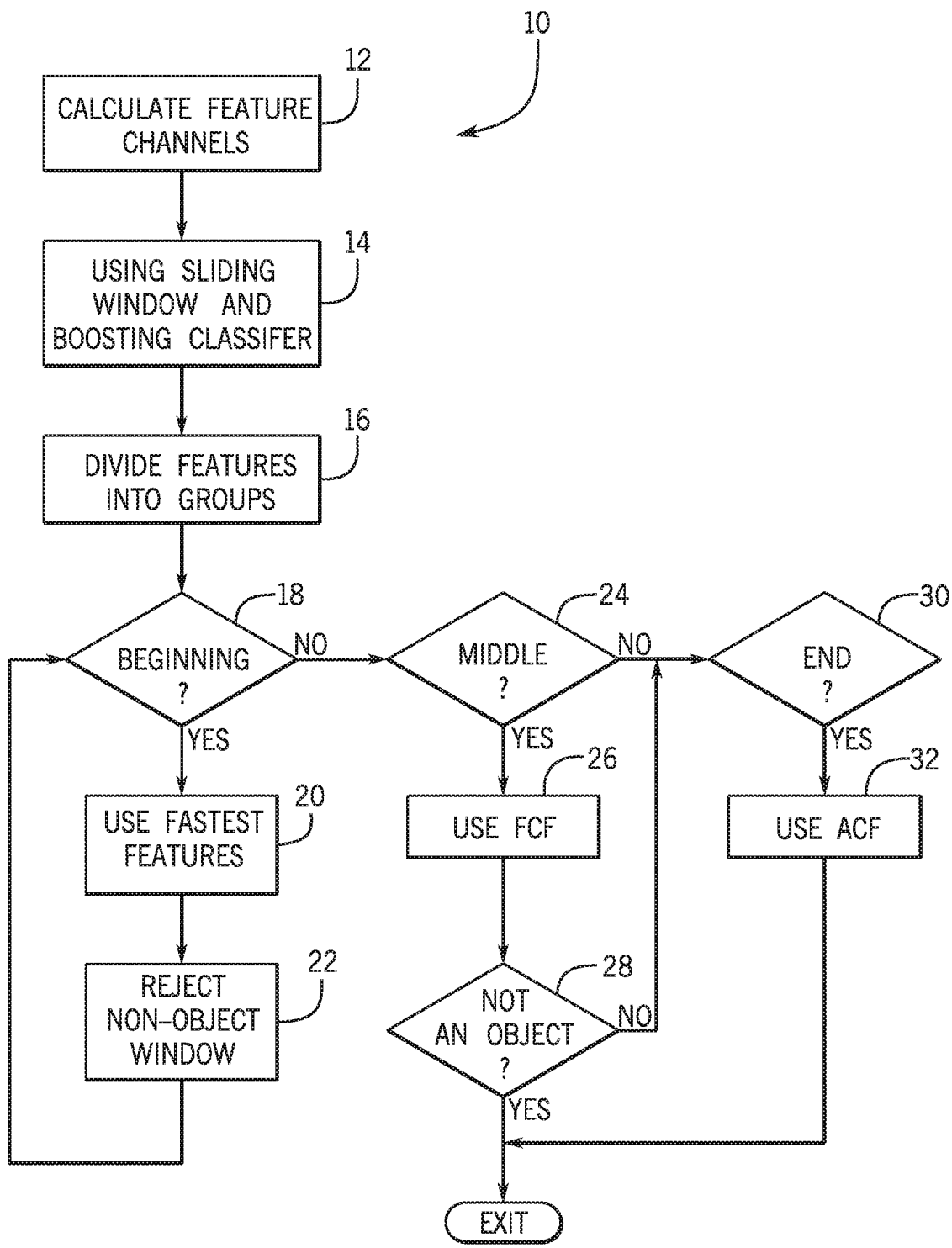
FIG. 3 is a flow chart for one embodiment.

A sequence 10 shown in FIG. 3 may be implemented in software, firmware and/or hardware in some embodiments. The sequence 10 may be implemented by computer executed instructions stored in one or more non-transitory computer readable media such as magnetic, optical or semiconductor storage.

The sequence 10 begins by calculating feature channels as indicated in block 12. A sliding window and boosting classifiers are used is indicated in block 14. The features are divided into groups as indicated in block 16.

Then at diamond 18 a check determines whether the initial or beginning group of features are received. If so, the fastest features are used with Aggregate Channel Features as indicated in block 20. Any non-object window is rejected as indicated in block 22.

If this is not the beginning features as determined in diamond 18, a check at diamond 24 determines whether it is the middle set of features. If so, Filtered Channel Features are used as indicated in block 26. Then a check at diamond 28 determines whether an object is not found. If so, the flow ends.

If an object is found then the flow continues to diamond 30 and it is determined if this is the last set of features. If so, then Adaptive Channel Features are used as indicated in block 32.

Figure 4:
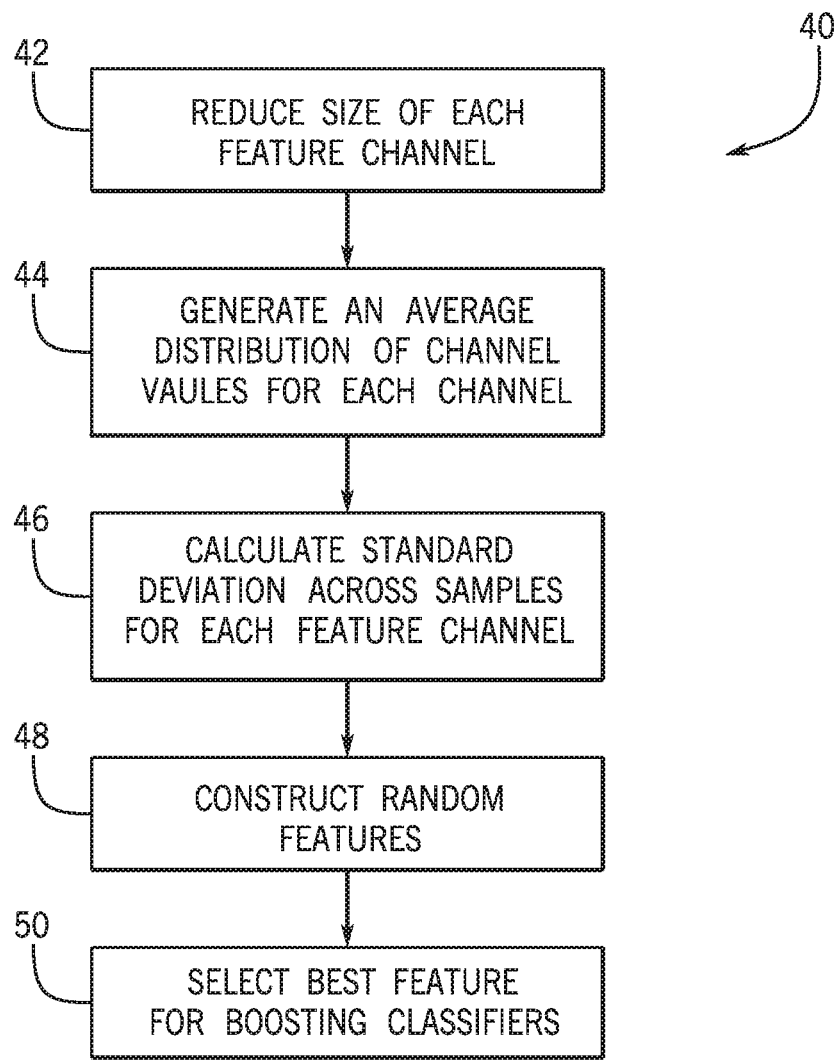
FIG. 4 is a flow chart for Adaptive Channel Features according to one embodiment.

The sequence 40 shown in FIG. 4 may be used for Adaptive Channel Features according to one embodiment. The sequence may be implemented in software, firmware and/or hardware. In software and firmware embodiments it may be implemented using computer executed instructions stored in one or more non-transitory computer readable media such as magnetic, optical or semiconductor storage.

The sequence 40 begins by reducing the size of each feature channel as indicated in block 42. Then an average distribution of channel values is generated for each channel as indicated in block 44. Next a standard deviation across samples for each feature channel is calculated as shown in block 46. Thereafter, random features are constructed as indicated in block 48. Finally the best feature for boosting classifiers is selected as shown in block 50.

The graphics processing techniques described herein may be implemented in various hardware architectures. For example, graphics functionality may be integrated within a chipset. Alternatively, a discrete graphics processor may be used. As still another embodiment, the graphics functions may be implemented by a general purpose processor, including a multicore processor.

Figure 5:
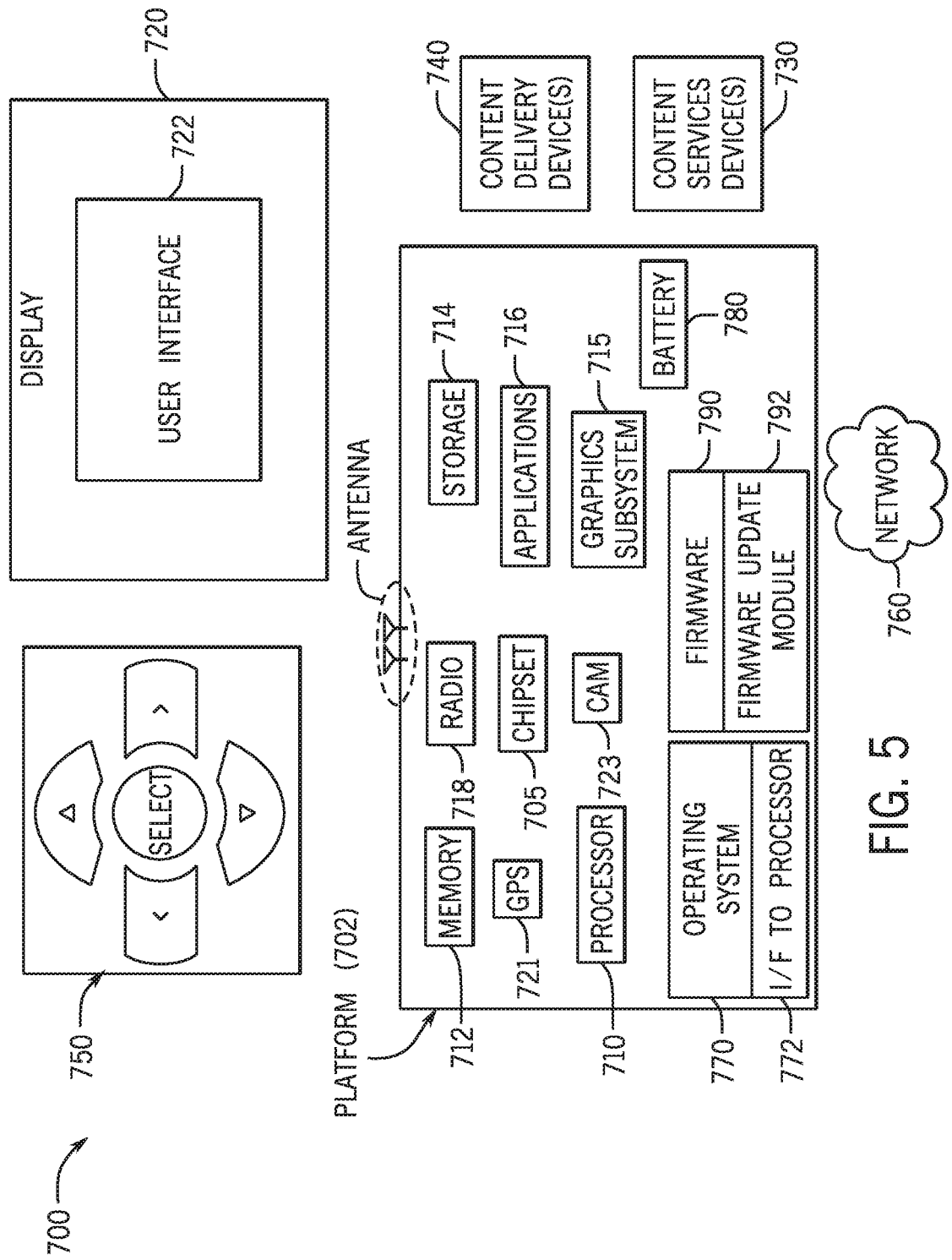
FIG. 5 is a system depiction for one embodiment.

FIG. 5 illustrates an embodiment of a system 700. In embodiments, system 700 may be a transmitter although system 700 is not limited to this context. For example, system 700 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In embodiments, system 700 comprises a platform 702 coupled to a display 720. Platform 702 may receive content from a content device such as content services device(s) 730 or content delivery device(s) 740 or other similar content sources. A navigation controller 750 comprising one or more navigation features may be used to interact with, for example, platform 702 and/or display 720. Each of these components is described in more detail below.

In embodiments, platform 702 may comprise any combination of a chipset 705, processor 710, memory 712, storage 714, graphics subsystem 715, applications 716 and/or radio 718. Chipset 705 may provide intercommunication among processor 710, memory 712, storage 714, graphics subsystem 715, applications 716 and/or radio 718. For example, chipset 705 may include a storage adapter (not depicted) capable of providing intercommunication with storage 714.

Processor 710 may be implemented as Complex Instruction Set Computer (CISC) or Reduced Instruction Set Computer (RISC) processors, x86 instruction set compatible processors, multi-core, or any other microprocessor or central processing unit (CPU). In embodiments, processor 710 may comprise dual-core processor(s), dual-core mobile processor(s), and so forth. The processor may implement the sequences of FIG. 3 together with memory 712.

Memory 712 may be implemented as a volatile memory device such as, but not limited to, a Random Access Memory (RAM), Dynamic Random Access Memory (DRAM), or Static RAM (SRAM).

Storage 714 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 714 may comprise technology to increase the storage performance enhanced protection for valuable digital media when multiple hard drives are included, for example.

Graphics subsystem 715 may perform processing of images such as still or video for display. Graphics subsystem 715 may be a graphics processing unit (GPU) or a visual processing unit (VPU), for example. An analog or digital interface may be used to communicatively couple graphics subsystem 715 and display 720. For example, the interface may be any of a High-Definition Multimedia Interface, DisplayPort, wireless HDMI, and/or wireless HD compliant techniques. Graphics subsystem 715 could be integrated into processor 710 or chipset 705. Graphics subsystem 715 could be a stand-alone card communicatively coupled to chipset 705.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

Radio 718 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, radio 718 may operate in accordance with one or more applicable standards in any version.

In embodiments, display 720 may comprise any television type monitor or display. Display 720 may comprise, for example, a computer display screen, touch screen display, video monitor, television-like device, and/or a television. Display 720 may be digital and/or analog. In embodiments, display 720 may be a holographic display. Also, display 720 may be a transparent surface that may receive a visual projection. Such projections may convey various forms of information, images, and/or objects. For example, such projections may be a visual overlay for a mobile augmented reality (MAR) application. Under the control of one or more software applications 716, platform 702 may display user interface 722 on display 720.

In embodiments, content services device(s) 730 may be hosted by any national, international and/or independent service and thus accessible to platform 702 via the Internet, for example. Content services device(s) 730 may be coupled to platform 702 and/or to display 720. Platform 702 and/or content services device(s) 730 may be coupled to a network 760 to communicate (e.g., send and/or receive) media information to and from network 760. Content delivery device(s) 740 also may be coupled to platform 702 and/or to display 720.

In embodiments, content services device(s) 730 may comprise a cable television box, personal computer, network, telephone, Internet enabled devices or appliance capable of delivering digital information and/or content, and any other similar device capable of unidirectionally or bidirectionally communicating content between content providers and platform 702 and/display 720, via network 760 or directly. It will be appreciated that the content may be communicated unidirectionally and/or bidirectionally to and from any one of the components in system 700 and a content provider via network 760. Examples of content may include any media information including, for example, video, music, medical and gaming information, and so forth.

Content services device(s) 730 receives content such as cable television programming including media information, digital information, and/or other content. Examples of content providers may include any cable or satellite television or radio or Internet content providers. The provided examples are not meant to limit the applicable embodiments.

In embodiments, platform 702 may receive control signals from navigation controller 750 having one or more navigation features. The navigation features of controller 750 may be used to interact with user interface 722, for example. In embodiments, navigation controller 750 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 750 may be echoed on a display (e.g., display 720) by movements of a pointer, cursor, focus ring, or other visual indicators displayed on the display. For example, under the control of software applications 716, the navigation features located on navigation controller 750 may be mapped to virtual navigation features displayed on user interface 722, for example. In embodiments, controller 750 may not be a separate component but integrated into platform 702 and/or display 720. Embodiments, however, are not limited to the elements or in the context shown or described herein.

In embodiments, drivers (not shown) may comprise technology to enable users to instantly turn on and off platform 702 like a television with the touch of a button after initial boot-up, when enabled, for example. Program logic may allow platform 702 to stream content to media adaptors or other content services device(s) 730 or content delivery device(s) 740 when the platform is turned "off." In addition, chip set 705 may comprise hardware and/or software support for 5.1 surround sound audio and/or high definition 7.1 surround sound audio, for example. Drivers may include a graphics driver for integrated graphics platforms. In embodiments, the graphics driver may comprise a peripheral component interconnect (PCI) Express graphics card.

In various embodiments, any one or more of the components shown in system 700 may be integrated. For example, platform 702 and content services device(s) 730 may be integrated, or platform 702 and content delivery device(s) 740 may be integrated, or platform 702, content services device(s) 730, and content delivery device(s) 740 may be integrated, for example. In various embodiments, platform 702 and display 720 may be an integrated unit. Display 720 and content service device(s) 730 may be integrated, or display 720 and content delivery device(s) 740 may be integrated, for example. These examples are not meant to be scope limiting.

In various embodiments, system 700 may be implemented as a wireless system, a wired system, or a combination of both. When implemented as a wireless system, system 700 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 700 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 702 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 5.

Figure 6:
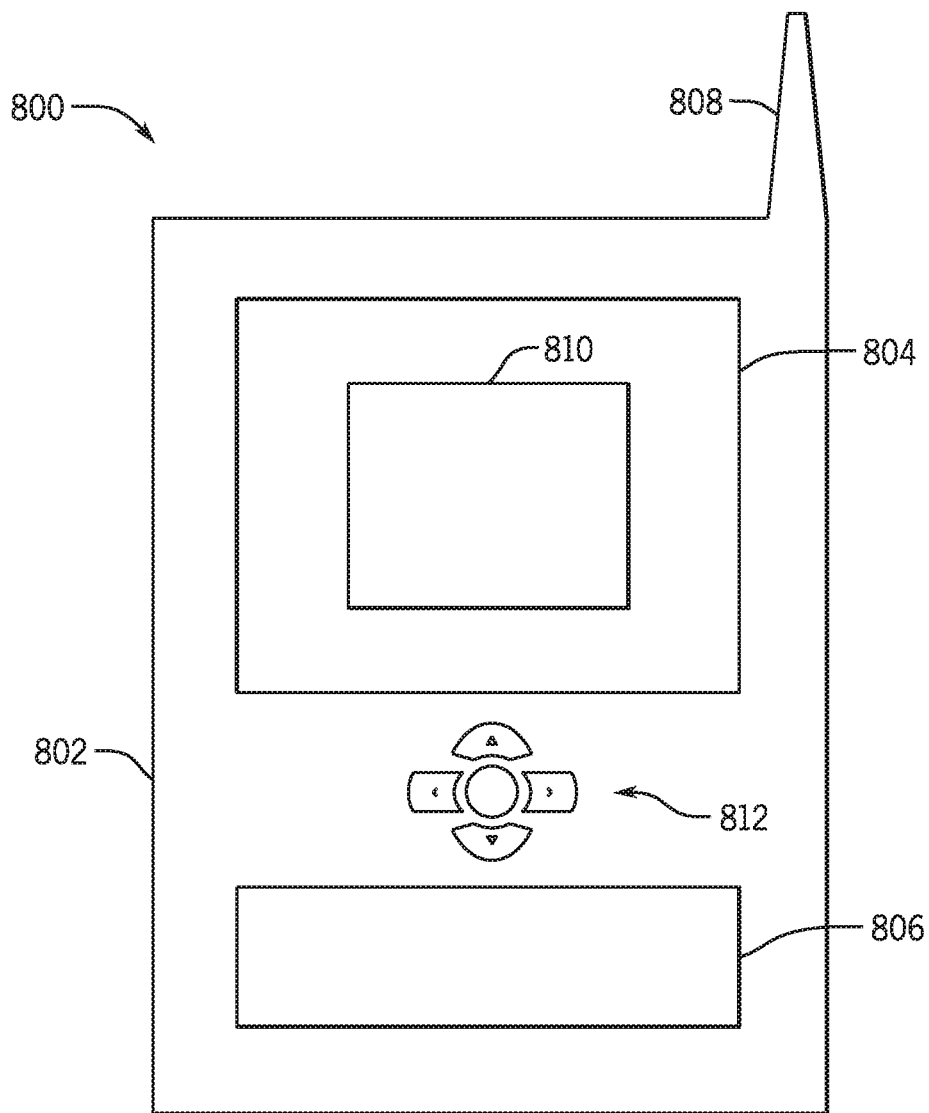
FIG. 6 is front elevation of a system according to one embodiment.

As described above, system 700 may be embodied in varying physical styles or form factors. FIG. 6 illustrates embodiments of a small form factor device 800 in which system 700 may be embodied. In embodiments, for example, device 800 may be implemented as a mobile computing device having wireless capabilities. A mobile computing device may refer to any device having a processing system and a mobile power source or supply, such as one or more batteries, for example.

As shown in FIG. 6, device 800 may comprise a housing 802, a display 804 and 810, an input/output (I/O) device 806, and an antenna 808. Device 800 also may comprise navigation features 812. Display 804 may comprise any suitable display unit for displaying information appropriate for a mobile computing device. I/O device 806 may comprise any suitable I/O device for entering information into a mobile computing device. Examples for I/O device 806 may include an alphanumeric keyboard, a numeric keypad, a touch pad, input keys, buttons, switches, rocker switches, microphones, speakers, voice recognition device and software, and so forth. Information also may be entered into device 800 by way of microphone. Such information may be digitized by a voice recognition device. The embodiments are not limited in this context.

The following clauses and/or examples pertain to further embodiments:

One example embodiment may be a method comprising determining random features by defining a maximum allowed feature size of a training sample, sampling random filter positions of a training sample, calculating pixel weights in a patch of the maximum allowed feature size, and selecting a feature for applying a boosting classifier. The method may also include using aggregate channel features for a first group of weak classifiers, using the same downscaled features channel, applying the filtered channel feature, and using features constructed based on errors of previously used weak classifiers as boosting classifiers. The method may also include applying a boosting training process based on selected training samples to select features and to calculate a training weight for each training sample, generating a weighted average distribution across all positive samples for each feature channel taking into account training weights, calculating a standard deviation across all positive samples for each feature channel, and constructing random features taking into account the average distribution of each feature channel and the standard deviation. The method may also include reducing a size of the feature channel. The method may also include determining a standard deviation across samples for said feature channel. The method may also include summing all channel pixels in said patch. The method may also include generating an average distribution of channel values. The method may also include generating based on training weights using only positive samples. The method may also include constructing random features taking into account the average distribution and standard deviation. The method may also include calculating a pixel weight having a maximal value of standard deviation.

In another example embodiment may be one or more non-transitory computer readable media storing instructions to perform a sequence comprising determining random features by defining a maximum allowed feature size of a training sample, sampling random filter positions of a training sample, calculating pixel weights in a patch of the maximum allowed feature size, and selecting a feature for applying a boosting classifier. The media may further store instructions to perform a sequence including using aggregate channel features for a first group of weak classifiers, using the same downscaled features channel, applying the filtered channel feature, and using features constructed based on errors of previously used weak classifiers as boosting classifiers. The media may further store instructions to perform a sequence including applying a boosting training process based on selected training samples to select features and to calculate a training weight for each training sample, generating a weighted average distribution across all positive samples for each feature channel taking into account training weights, calculating a standard deviation across all positive samples for each feature channel, and constructing random features taking into account the average distribution of each feature channel and the standard deviation. The media may further store instructions to perform a sequence including reducing a size of the feature channel. The media may further store instructions to perform a sequence including determining a standard deviation across samples for said feature channel. The media may further store instructions to perform a sequence including summing all channel pixels in said patch. The media may further store instructions to perform a sequence including generating an average distribution of channel values. The media may further store instructions to perform a sequence including generating based on training weights using only positive samples. The media may further store instructions to perform a sequence including constructing random features taking into account the average distribution and standard deviation. The media may further store instructions to perform a sequence including calculating a pixel weight having a maximal value of standard deviation.

Another example embodiment may be an apparatus comprising a processor to determine random features by defining a maximum allowed feature size of a training sample, sample random filter positions of a training sample, calculate pixel weights in a patch of the maximum allowed feature size, select a feature for applying a boosting classifier, and a memory coupled to said processor. The apparatus may include said processor to use aggregate channel features for a first group of weak classifiers, use the same downscaled features channel, applying the filtered channel feature, and use features constructed based on errors of previously used weak classifiers as boosting classifiers. The apparatus may include said processor to further apply a boosting training process based on selected training samples to select features and to calculate a training weight for each training sample, generate a weighted average distribution across all positive samples for each feature channel taking into account training weights, calculate a standard deviation across all positive samples for each feature channel, and construct random features taking into account the average distribution of each feature channel and the standard deviation. The apparatus may include said processor to reduce a size of the feature channel. The apparatus may include said processor to determine a standard deviation across samples for said feature channel. The apparatus may include said processor to sum all channel pixels in said patch. The apparatus may include said processor to generate an average distribution of channel values. The apparatus may include said processor to generate based on training weights using only positive samples. The apparatus may include said processor to construct random features taking into account the average distribution and standard deviation. The apparatus may include said processor to calculate a pixel weight having a maximal value of standard deviation.

References throughout this specification to "one embodiment" or "an embodiment" mean that a particular feature, structure, or characteristic described in connection with the embodiment is included in at least one implementation encompassed within the present disclosure. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While a limited number of embodiments have been described, those skilled in the art will appreciate numerous modifications and variations therefrom. It is intended that the appended claims cover all such modifications and variations as fall within the true spirit and scope of this disclosure.

What is claimed is:

1. A method comprising:
    generating a plurality of feature channels based on an input image;
    identifying features in the plurality of feature channels using a sliding window approach and a boosting classifier;
    dividing the identified features into a plurality of feature groups, the plurality of feature groups including a first feature group comprising fastest features of the identified features; and
    performing a first classification process using the first feature group, the first classification process using a first group of weak classifiers based on aggregate channel features.

2. The method of claim 1 further including:
    after performing the first classification process using the first feature group, performing a second classification process using a second feature group comprising computationally expensive features of the identified features, the second classification process based on adaptive channel features.

3. The method of claim 2 the second classification process including:
    applying a boosting training process based on selected training samples to select features and to calculate a training weight for each training sample;
    generating a weighted average distribution across all positive samples for each feature channel taking into account training weights;
    calculating a standard deviation across all positive samples for each feature channel; and constructing random features taking into account the average distribution of each feature channel and the standard deviation.

4. The method of claim 3 further including:
after performing the first classification process and before performing the second classification process, performing a third classification process using a third feature group, the third classification process based on filtered channel features.

5. The method of claim 3, the second classification process including calculating a pixel weight having a maximal value of standard deviation.

6. The method of claim 2, the second classification process including:
determining random features by defining a maximum allowed feature size of a training sample;
sampling random filter positions of the training sample;
calculating pixel weights in a patch of the maximum allowed feature size; and
selecting a feature for applying a boosting classifier.

7. The method of claim 6, the second classification process including summing all channel pixels in said patch.

8. The method of claim 1, wherein the boosting classifier is a boosting chain that performs an iterative sum of a plurality of weak classifier responses.

9. The method of claim 8 including:
for each iteration of the iterative sum, comparing a sum value to a threshold; and
in response a determination that the sum value exceeds the threshold for each iteration, storing a position and size of a sliding window together with a final sum value.

10. The method of claim 9 including:
in response a determination that the sum value is below the threshold in a particular iteration, ending the iterative sum.

11. One or more non-transitory computer readable media storing instructions to perform a sequence comprising:
generating a plurality of feature channels based on an input image;
identifying features in the plurality of feature channels using a sliding window approach and a boosting classifier;
dividing the identified features into a plurality of feature groups, the plurality of feature groups including a first feature group comprising fastest features of the identified features; and
performing a first classification process using the first feature group, the first classification process using a first group of weak classifiers based on aggregate channel features.

12. The media of claim 11, further storing instructions to perform a sequence including:
after performing the first classification process using the first feature group, performing a second classification process using a second feature group comprising computationally expensive features of the identified features, the second classification process based on adaptive channel features.

13. The media of claim 12, further storing instructions to perform the second classification process including:
applying a boosting training process based on selected training samples to select features and to calculate a training weight for each training sample;
generating a weighted average distribution across all positive samples for each feature channel taking into account training weights;
calculating a standard deviation across all positive samples for each feature channel; and
constructing random features taking into account the average distribution of each feature channel and the standard deviation.

14. The media of claim 13, storing instructions to perform a sequence including:
after performing the first classification process and before performing the second classification process, performing a third classification process using a third feature group, the third classification process based on filtered channel features.

15. The media of claim 13, storing instructions to perform the second classification process including calculating a pixel weight having a maximal value of standard deviation.

16. The media of claim 12, storing instructions to perform the second classification process including:
determining random features by defining a maximum allowed feature size of a training sample;
sampling random filter positions of the training sample;
calculating pixel weights in a patch of the maximum allowed feature size; and
selecting a feature for applying a boosting classifier.

17. The media of claim 16, storing instructions to perform the second classification process including summing all channel pixels in said patch.

18. The media of claim 11, wherein the boosting classifier is a boosting chain that performs an iterative sum of a plurality of weak classifier responses.

19. The media of claim 18, storing instructions to perform a sequence including:
for each iteration of the iterative sum, comparing a sum value to a threshold; and
in response a determination that the sum value exceeds the threshold for each iteration, storing a position and size of a sliding window together with a final sum value.

20. The media of claim 19, storing instructions to perform a sequence including:
in response a determination that the sum value is below the threshold in a particular iteration, ending the iterative sum.

21. An apparatus comprising:
a processor to:
generate a plurality of feature channels based on an input image;
identify features in the plurality of feature channels using a sliding window approach and a boosting classifier;
divide the identified features into a plurality of feature groups, the plurality of feature groups including a first feature group comprising fastest features of the identified features; and
perform a first classification process using the first feature group, the first classification process using a first group of weak classifiers based on aggregate channel features; and
a memory coupled to said processor.

22. The apparatus of claim 21, said processor to:
after performing the first classification process using the first feature group, perform a second classification process using a second feature group comprising computationally expensive features of the identified features, the second classification process based on adaptive channel features.

23. The apparatus of claim 22, said processor to, in the second classification process:

apply a boosting training process based on selected training samples to select features and to calculate a training weight for each training sample,
generate a weighted average distribution across all positive samples for each feature channel taking into account training weights,
calculate a standard deviation across all positive samples for each feature channel, and
construct random features taking into account the average distribution of each feature channel and the standard deviation.

24. The apparatus of claim 23, said processor to:
after performing a first classification process and before performing the second classification process, perform a third classification process using a third feature group, the third classification process based on filtered channel features.

25. The apparatus of claim 23, said processor to, in the second classification process, calculate a pixel weight having a maximal value of standard deviation.

26. The apparatus of claim 22, said processor to, in the second classification process:
determine random features by defining a maximum allowed feature size of a training sample;
sample random filter positions of the training sample;
calculate pixel weights in a patch of the maximum allowed feature size; and
select a feature for applying a boosting classifier.

27. The apparatus of claim 26, said processor to, in the second classification process, sum all channel pixels in said patch.

28. The apparatus of claim 21, wherein the boosting classifier is a boosting chain that performs an iterative sum of a plurality of weak classifier responses.

29. The apparatus of claim 28, said processor to:
for each iteration of the iterative sum, compare a sum value to a threshold; and
in response a determination that the sum value exceeds the threshold for each iteration, store a position and size of a sliding window together with a final sum value.

30. The apparatus of claim 29, said processor to:
in response a determination that the sum value is below the threshold in a particular iteration, end the iterative sum.

* * * * *